(12) United States Patent
Nozu et al.

(10) Patent No.: US 6,436,584 B1
(45) Date of Patent: Aug. 20, 2002

(54) IMAGE-RECORDING MEDIUM, METHOD FOR FORMING IMAGE-RECORDING MEDIUM, METHOD AND APPARATUS FOR READING DATA

(75) Inventors: Taketo Nozu; Shigehiro Kitamura, both of Hino (JP)

(73) Assignee: Konica Corporation, Tokyo (JP)

( * ) Notice: Subject to any disclaimer, the term of this patent is extended or adjusted under 35 U.S.C. 154(b) by 55 days.

(21) Appl. No.: 09/624,329

(22) Filed: Jul. 24, 2000

(30) Foreign Application Priority Data

Jul. 27, 1999 (JP) .......................................... 11-212792

(51) Int. Cl.[7] .............................................. H01L 25/00
(52) U.S. Cl. ..................... 430/1; 430/2; 359/2; 359/22; 359/25; 359/32; 283/86; 283/94
(58) Field of Search ........................... 430/1, 2; 359/2, 359/22, 25, 32; 283/86, 94

(56) References Cited

U.S. PATENT DOCUMENTS 5,411,296 A * 5/1995 Mallik ......................... 283/86
5,856,048 A * 1/1999 Tahara et al. ................. 430/1

* cited by examiner

Primary Examiner—John A. McPherson
(74) Attorney, Agent, or Firm—Frishauf, Holtz, Goodman & Chick, P.C.

(57) ABSTRACT

There is described an image-recording medium and an image-reading method, which make it possible to improve reading accuracy of information by avoiding duplication of an optical variable image with the information. The image-recording medium includes a substrate, an image-receiving layer provided on the substrate and an optical variable layer provided on the substrate, wherein at least a part of the optical variable layer includes an optical variable image, and the optical variable image is formed in a manner such that the optical variable image, overlapping with an image recorded on the image-receiving layer, emerges in a first direction, while the optical variable image, overlapping with an image recorded on the image-receiving layer, does not emerge in a second direction.

14 Claims, 9 Drawing Sheets

IMAGE-RECORDING MEDIUM, METHOD FOR FORMING IMAGE-RECORDING MEDIUM, METHOD AND APPARATUS FOR READING DATA

BACKGROUND OF THE INVENTION

The present invention relates to a memory card storing personal data etc., which provides security against forging or altering the card, or relates to an image-recording medium, a method and apparatus for reading data, which is desirably suited for passports, etc.

Recently, in the field of service industries such as, for instance, banks, companies, schools, government offices, etc., electronic cards or magnetic cards of contact type or non-contact type have proliferated widely. Various kinds of data are recorded on cards utilized in the abovementioned fields, such as cash-cards, employee identification cards, company staff identification cards, membership cards, student identification cards, certificates of alien registration, various kinds of license cards, passports, etc. In addition, a security processing is applied for such cards, not to be easily forged or altered.

For instance, a special image is formed in a hologram-layer fabricated on the card substrate to prevent a portrait image, a name, an issue date, etc., from being easily imitated. This special image is formed as an optical variable image, which is generally called as a holographic image or a diffraction grating image. A holographic image is formed by interference fringes, which are generated by overlapping a light-wave, reflected or transmitted from the subject, with a reference light-wave. A virtual three-dimensional image can be reconstructed by means of such holographic image. A protective sheet, made of a transparent resin such as a laminate, etc., covers the hologram-layer, which is less wear resistant than the card substrate.

Although the information bearing layer and the hologram-layer are fabricated on the card substrate, as mentioned above, there is a possibility that reading errors of the information could occur due to duplication of the holographic image and the information, when an optical reading apparatus reads the information by means of reflected light at sites such as, for instance, an admission place for shopping, passing or entrances.

SUMMARY OF THE INVENTION

To overcome the abovementioned drawbacks in conventional image-recording media, it is an object of the present invention to provide an image-recording medium, an information-reading apparatus and an image-reading method, which make it possible to improve reading accuracy of information by avoiding duplication of an optical variable image with the information.

Accordingly, to overcome the cited shortcomings, the abovementioned object of the present invention can be attained by image-recording media and an image reading methods described as follow.

(1) An image-recording medium, comprising a substrate, an image-receiving layer provided on the substrate and an optical variable layer provided on the substrate, wherein at least a part of the optical variable layer comprises an optical variable image, and the optical variable image is formed in a manner such that the optical variable image, overlapping with an image recorded on the image-receiving layer, emerges in a first direction, while the optical variable image, overlapping with an image recorded on the image-receiving layer, does not emerge in a second direction.

(2) The image-recording medium of item 1, wherein the optical variable image is formed on information recorded on the image-receiving layer.

(3) The image-recording medium of item 1, wherein both a first optical variable image and a second optical variable image are formed in the optical variable layer, a viewing angle of the first optical variable image is different from that of second optical variable image.

(4) The image-recording medium of item 3, wherein the second optical variable image is formed on at least a part of characters recorded on the image-receiving layer.

(5) The image-recording medium of item 1, wherein an optical variable image is formed on at least a part of characters recorded on the image-receiving layer so as to overlap with the characters, and the following equation is fulfilled, $$0.3 \leq (M_o - M_x)/M_x \quad (1)$$

where: $M_x$; the reflectance at a point, at which the characters are formed under the optical variable image, $M_o$; the reflectance at a point, at which the characters are not formed under the optical variable image.

(6) A method for reading information from an image-recording medium, which comprises a substrate, an image-receiving layer provided on the substrate to record the information in it and an optical variable layer provided on the substrate, comprising steps of irradiating a light onto the image-recording medium and reading a reflected light form a second direction, wherein at least a part of the optical variable layer comprises an optical variable image, and the optical variable image is formed in a manner such that the optical variable image, overlapping with an image recorded on the image-receiving layer, emerges in a first direction, while the optical variable image, overlapping with an image recorded on the image-receiving layer, does not emerge in the second direction.

(7) A method for reading information from an image-recording medium, which comprises a substrate, an image-receiving layer provided on the substrate to record the information in it and an optical variable layer provided on the substrate, comprising steps of irradiating a light onto the image-recording medium and reading a reflected light, wherein an optical variable image is formed in at least a part of the optical variable layer, and in the step of reading a reflected light, the reflected light having a wavelength other than a wavelength of the optical variable image is read.

(8) A method for reading information from an image-recording medium, which comprises a substrate, an image-receiving layer provided on the substrate to record the information in it and an optical variable layer provided on the substrate, comprising steps of irradiating a light onto the image-recording medium and reading a reflected light, wherein an optical variable image is formed in at least a part of the optical variable layer, and in the step of reading a reflected light, the reflected light is read from an angle other than a viewing angle of the optical variable image.

Further, to overcome the abovementioned problems, other image recording media, information-reading apparatus and image-reading methods, embodied in the present invention, will be described as follow:

(9) An image-recording medium, characterized in that, in the image-recording medium in which an optical variable layer and an image-receiving layer are successively overlaid with a card substrate and comprises information in the image-receiving layer, the optical variable layer is structured in such a manner that the optical reading apparatus can read only the information by receiving the reflected light in the predetermined direction, in which no optical variable images, overlapping with the information, emerge on the image-recording medium.

According to the image-recording medium described in item 9, accuracy for reading the information will be improved, since no optical variable images, overlapped with information, emerge on the image-recording medium, when reading the information from the predetermined direction by using the reflected light.

(10) An information-reading apparatus, characterized in that the image-recording medium, in which an optical variable layer and an image-receiving layer are successively overlaid with a card substrate, comprises the optical variable layer, which is structured in such a manner that the information-reading apparatus can read the information by using the reflected light, and the information-reading apparatus comprises a reading section to only read the information of the image-recording medium by receiving the reflected light in a predetermined direction, in which no optical variable images, overlapped with the information, emerge.

According to the information-reading apparatus described in item 10, accuracy for reading the information will be improved, since no optical variable images, overlapped with information, emerge on the image-recording medium, when reading the information from the predetermined direction by using the reflected light.

(11) The information-reading apparatus described in item 10, characterized in that the information-reading apparatus reads the information by relatively moving the image-recording medium and the reading section in the predetermined direction.

According to the information-reading apparatus described in item 11, accuracy for reading the information will be improved, since no optical variable images, overlapped with the information, emerge on the image-recording medium, when reading the information by relatively moving the image-recording medium and the reading section in the predetermined direction.

(12) An information-reading method, characterized in that the image-recording medium, in which an optical variable layer and an image-receiving layer are successively overlaid with a card substrate, comprises the optical variable layer, which is structured in such a manner that an information-reading apparatus can read the information by using the reflected light, and a reading section of the information-reading apparatus reads the information of the image-recording medium by receiving the reflected light in a predetermined direction, in which no optical variable images, overlapped with the information, emerge.

According to the information-reading method described in item 12, accuracy for reading the information will be improved, since no optical variable images, overlapped with information, emerge on the image-recording medium, when reading the information from the predetermined direction by using the reflected light.

(13) The information-reading method described in item 12, characterized in that the information-reading apparatus reads the information by relatively moving the image-recording medium and the reading section in the predetermined direction.

According to the information-reading method described in item 13, accuracy for reading the information will be improved, since no optical variable images, overlapped with the information, emerge on the image-recording medium, when reading the information by relatively moving the image-recording medium and the reading section in the predetermined direction.

BRIEF DESCRIPTION OF THE DRAWINGS

Other objects and advantages of the present invention will become apparent upon reading the following detailed description and upon reference to the drawings in which:

FIG. 5(a) shows a plan view of the image-recording medium, when the long axis of it coincide with the scanning direction of the optical reading apparatus, while

DETAILED DESCRIPTION OF THE PREFERRED EMBODIMENT

In the following, the image-recording medium, the method and apparatus for reading information, embodied in the present invention, will be detailed. However, the scope of the present invention is not limited to the descriptions and drawings described below.

Figure 1:
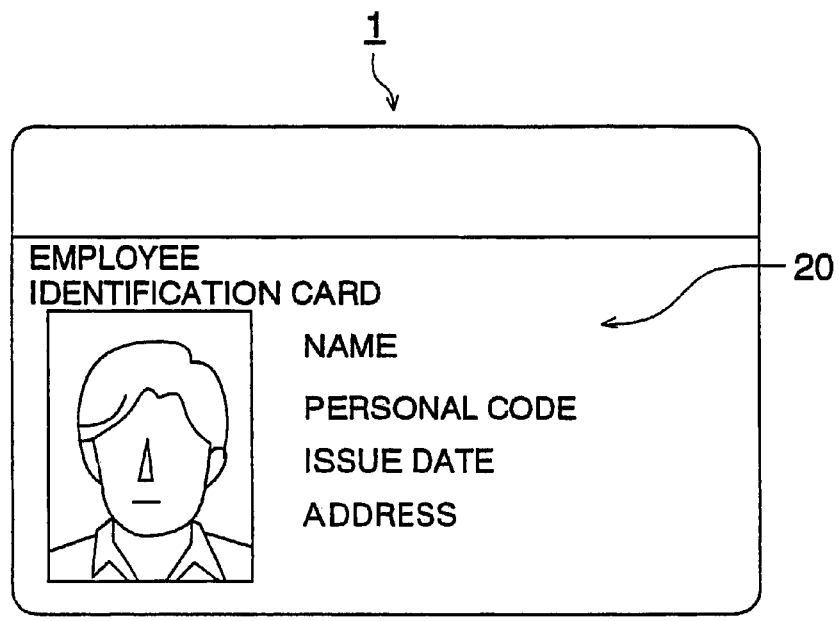
FIG. 1 shows a plan view of an image-recording medium.
Figure 2:
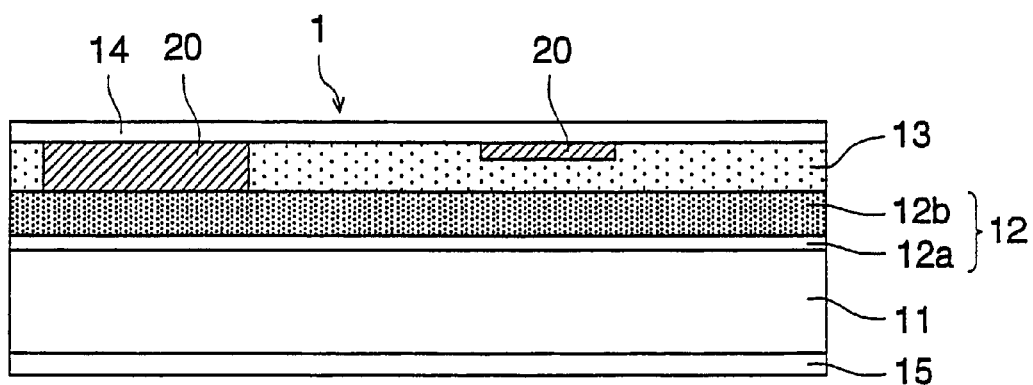
FIG. 2 shows an explanatory illustration of a layer structure of the image-recording medium.

FIG. 1 shows a plan view of the image-recording medium, while FIG. 2 shows an explanatory illustration of the layer structure of the image-recording medium.

The image-recording medium 1, embodied in the present invention, is an example of an employee identification card comprising optical variable layer 12, image-receiving layer 13 and protective layer 14, each of which is successively overlaid on card substrate 11. To form an optical variable image, the optical variable layer 12 further comprises transparent thin layer 12a and hologram layer 12b, which bears a hallmark on one side of it. It is desirable that the optical variable image formed in optical variable layer 12 has directivity, and hereinafter, all of the optical variable images described in this specification have directivity. In addition, it is also desirable that either a hologram image or a diffraction grating or an embossed relief is formed in optical variable layer 12, since those are more effective than other optical variable images to prevent the card from forging or altering. Among the various options, either a hologram image or a scaled image is furthermore desirable.

In image-recording medium 1, information 20, including characters, symbols, portrait images, etc., are recorded on image-receiving layer 13. For instance, the thermal sublimation transfer technique can be applied for recording portrait images, while the thermal fusion transfer technique can be applied for recording characters and symbols. After the abovementioned thermal transfer process has been finalized, an ionizing radiation cure layer is overlaid on image-receiving layer 13 to form protective layer 14. The ionizing radiation cure layer includes a UV cure resin layer, which is formed by applying UV liquid on image-receiving layer 13 and by irradiating an ultra-violet light on it.

The structure of optical variable layer 12 is formed in such a manner that the optical reading apparatus can read only information 20 by receiving the reflected light in a predetermined direction, in which no optical variable images, overlapped with information 20, emerge from image-recording medium 1.

Image-recording medium 1 further comprises handwriting layer 15 formed on the non data bearing surface of card substrate 11, namely being on the opposite surface of optical variable layer 12, allowing a hand-written endorsement. In addition, card substrate 11, which incorporates an IC module, can be desirably utilized for electronic cards or magnetic cards of either a contact type or non-contact type.

Figure 3:
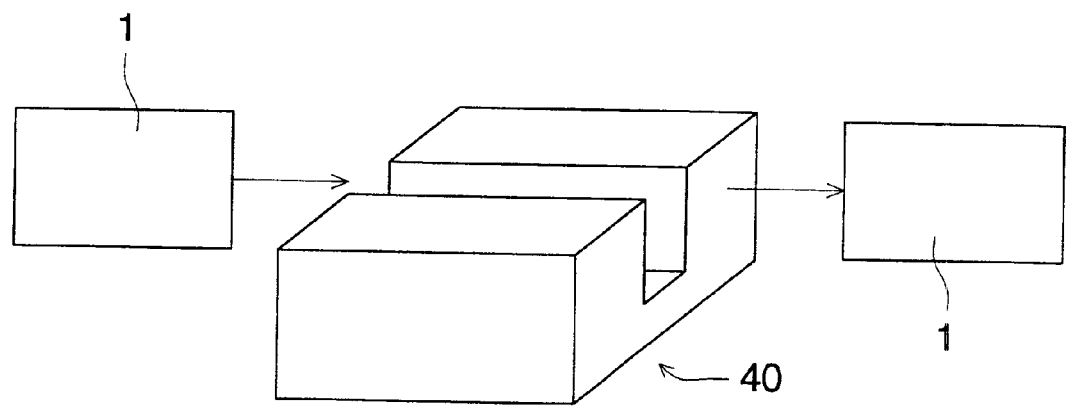
FIG. 3(a) and FIG. 3(b) show a perspective view of an optical reading apparatus and a structural illustration of a reading section, respectively.
Figure 3:
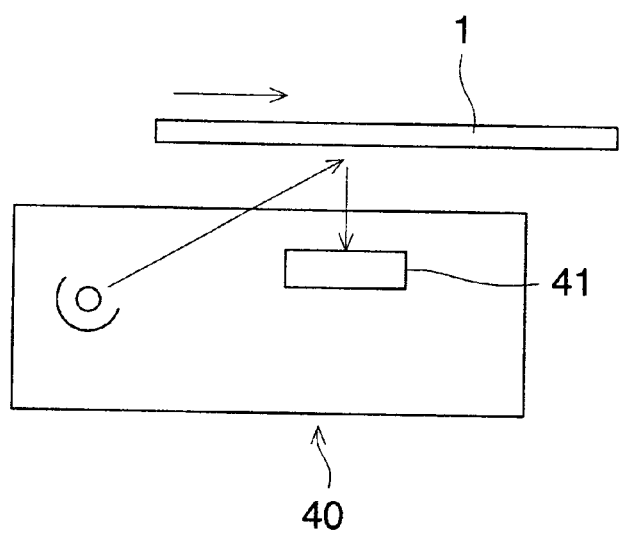
Figure 4:
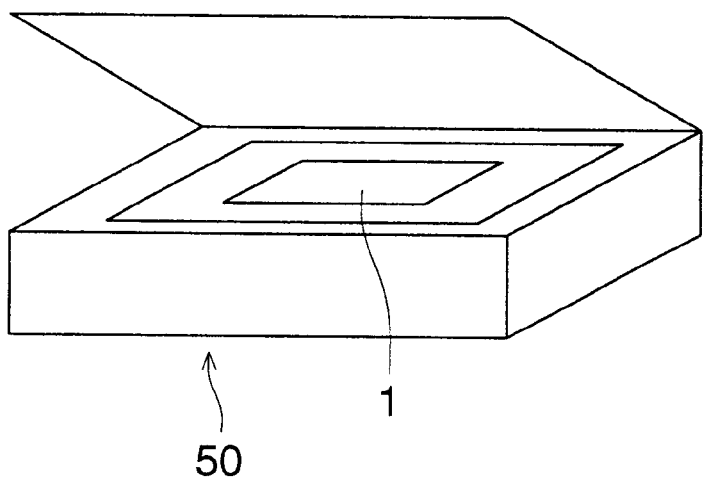
FIG. 4(a) and FIG. 4(b) show a perspective view of another optical reading apparatus, and a structural illustration of a reading section of another optical reading apparatus, respectively.
Figure 4:
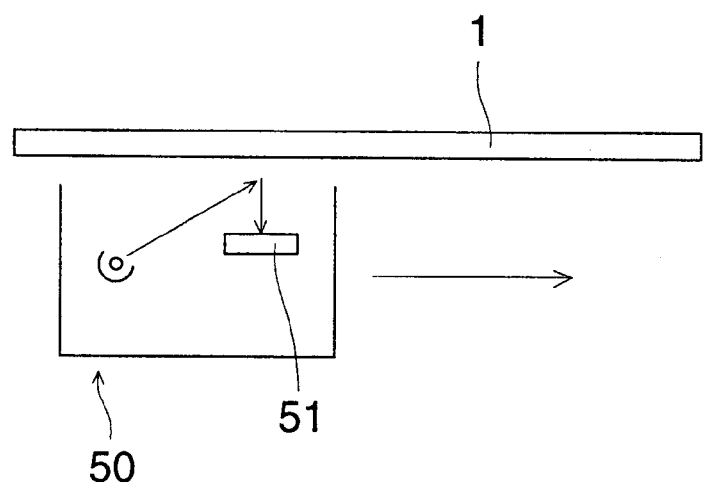

Optical reading apparatus 40, shown in FIG. 3(*a*), FIG. 3(*b*), FIG. 4(*a*) and FIG. 4(*b*), reads information 20 recorded on image-recording medium 1 by receiving the light reflected from it. FIG. 3(*a*) shows a perspective view of the optical reading apparatus, while FIG. 3(*b*) shows a structural illustration of its reading section, in which information 20 is read by moving image-recording medium 1 relative to reading section 41 of optical reading apparatus 40.

FIG. 4(*a*) shows a perspective view of the optical reading apparatus, while FIG. 4(*b*) shows a structural illustration of its reading section, in which information 20 is read by moving reading section 51 of optical reading apparatus 50 in relative to image-recording medium 1.

Figure 5A:
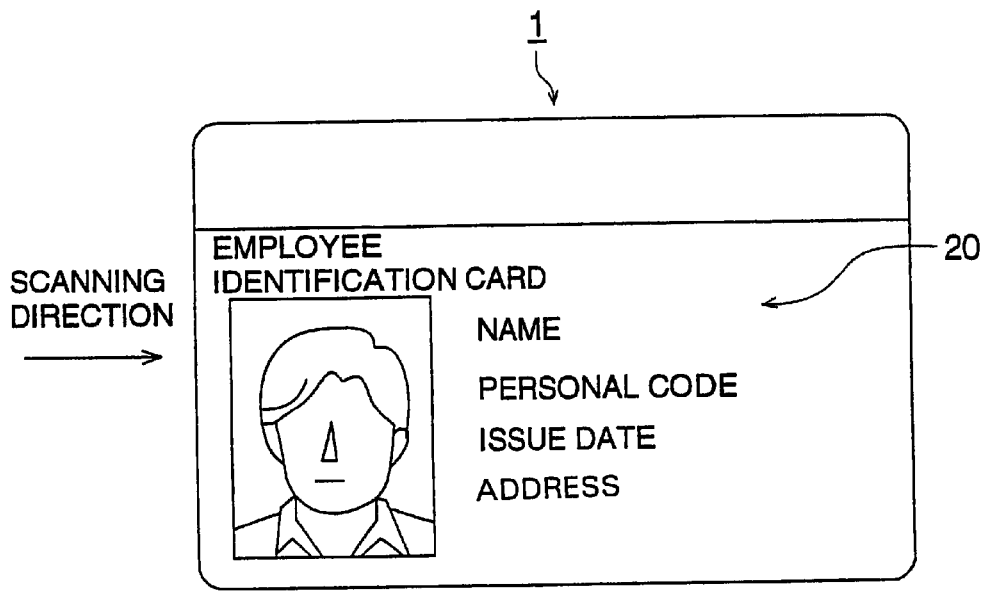
Figure 5B:
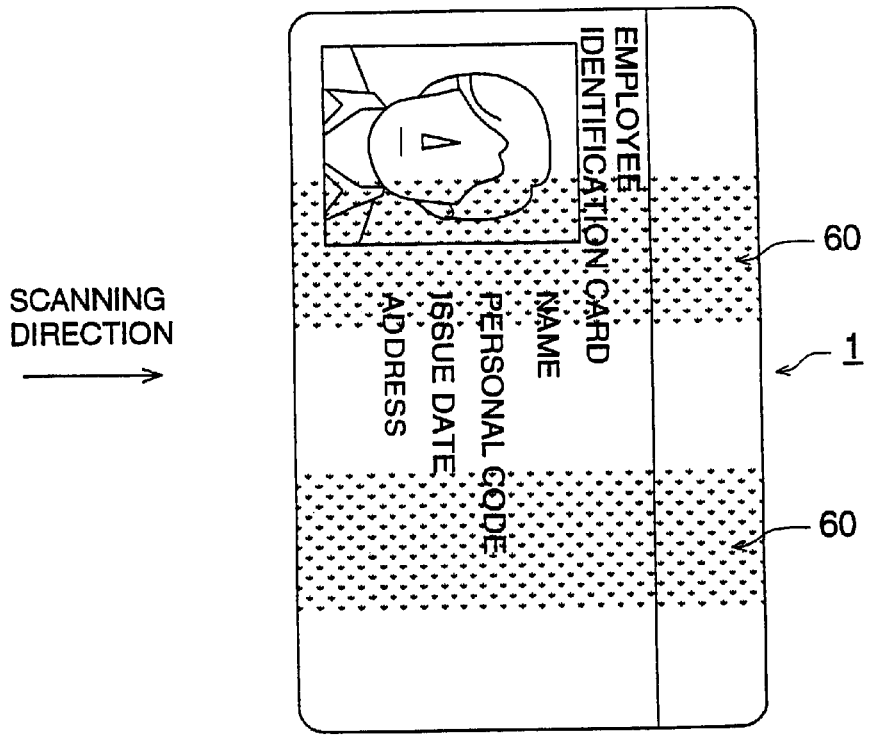
FIG. 5(b) shows a plan view of the image-recording medium, when the short axis of it coincide with the scanning direction of the optical reading apparatus.

FIG. 5(*a*) shows a plan view of image-recording medium 1, in which its long axis coincides with the scanning direction of the optical reading apparatus, while FIG. 5(*b*) shows a plan view of image-recording medium 1, in which its short axis coincides with the scanning direction of the optical reading apparatus. As shown in FIG. 5(*a*), no optical variable images, overlapping with information 20, emerge on image-recording medium 1, when the optical reading apparatus reads the reflected light of information 20 by scanning image-recording medium 1 in the direction of its long axis. While, as shown in FIG. 5(*b*), the optical variable images, overlapping with information 20, emerge on image-recording medium 1, when the optical reading apparatus reads the reflected light of information 20 by scanning image-recording medium 1 in the direction of its short axis.

In image-recording medium 1, the structure of the optical variable layer is formed in such a manner that the optical reading apparatus 40 or 50 can read information 20 only by receiving the reflected light in the predetermined direction, in which no optical variable images, overlapped with information 20, emerge on image-recording medium 1. Therefore, it is possible for an optical reading apparatus to improve reading accuracy of information 20, since no optical variable images 60, overlapped with information 20, emerge on image-recording medium 1, when the optical reading apparatus reads information 20 with the reflected light by scanning image-recording medium 1 in the predetermined direction, namely for instance, the direction of its long axis.

Figure 6:
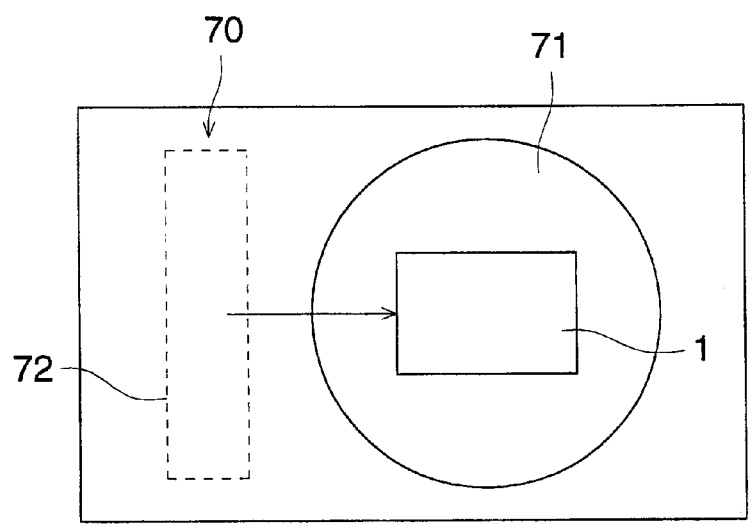
FIG. 6 shows a plan view of an information-reading apparatus.

FIG. 6 shows a plan view of information reading apparatus 70, comprising card table 71 and reading section 72.

Rotatable card table 71 changes the scanning direction of image-recording medium 1, and reading section 72 moves in the direction designated by an arrow, to read the recorded information.

Figure 7:
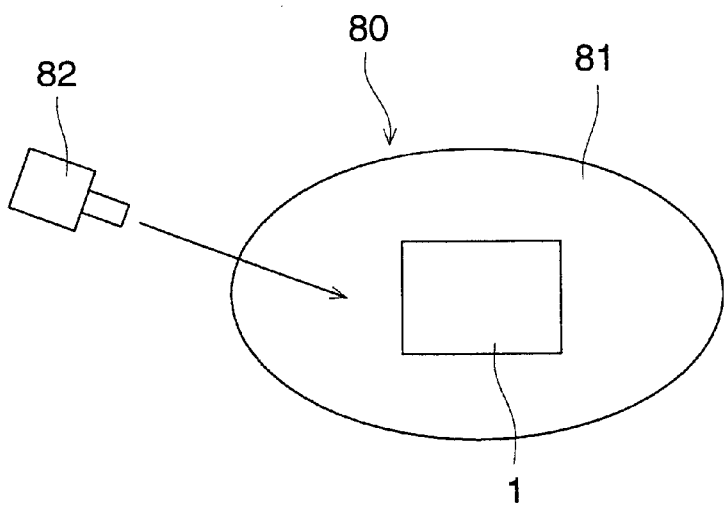
FIG. 7 shows a plan view of another information reading apparatus.

FIG. 7 shows a plan view of information reading apparatus 80, comprising card table 81 and reading section 82.

Card table 81 is also rotatable to change the scanning direction of image-recording medium 1, and reading section 82, comprising a CCD camera, moves in the direction designated by an arrow, to read the recorded information.

As mentioned above, the information reading apparatus comprises a reading section, which reads information 20 of image-recording medium 1 by receiving the reflected light in the predetermined direction, in which no optical variable images, overlapped with information 20, emerge on image-recording medium 1. Therefore, it is possible for the information reading apparatus to improve reading accuracy of information 20, since no optical variable images, overlapped with information 20, emerge on image-recording medium 1, when the optical reading apparatus reads information 20 with the reflected light by scanning image-recording medium 1 from the predetermined direction.

Incidentally, although the exemplified embodiment of the image-recording medium, in which optical variable layer 12 is inserted between image-receiving layer 13 and card substrate 11, has been described in the above, the scope of the present invention is not limited within the abovementioned embodiment. An embodiment, in which card substrate 11 is simply overlaid with optical variable layer 12 and image-receiving layer 13, is also applicable. Further, it is especially desirable that optical variable layer 12 and image-receiving layer 13 are placed on card substrate 11 in the order shown in FIG. 8, to prevent the image-recording medium from forging or altering.

Next, the second embodiment will be described in the following.

Figure 8:
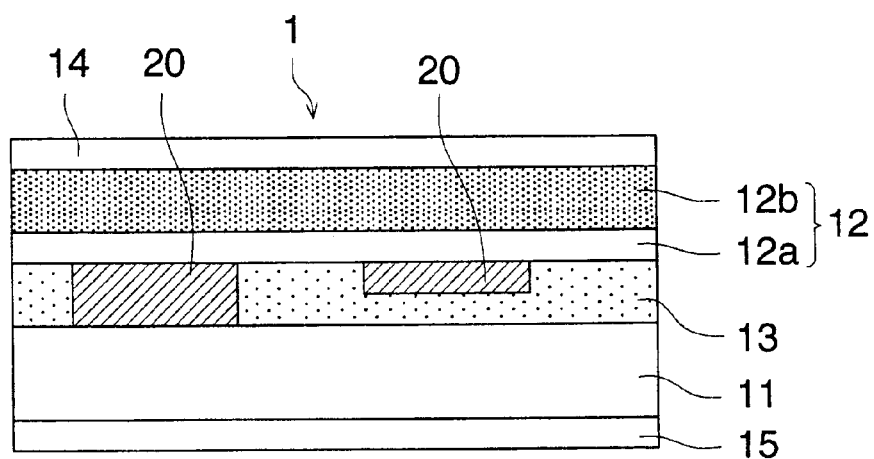
FIG. 8 shows an explanatory illustration of the layer structure of the image-recording medium.
Figure 9:
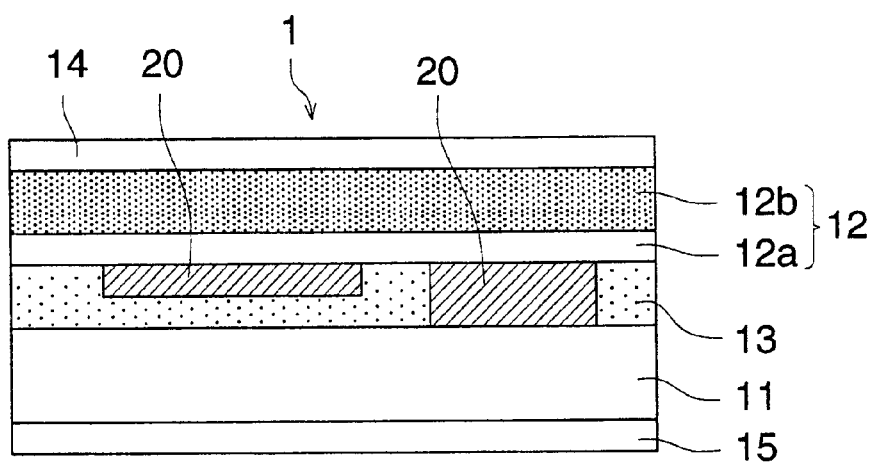
FIG. 9 shows an explanatory illustration of the layer structure of another image-recording medium.
Figure 10:
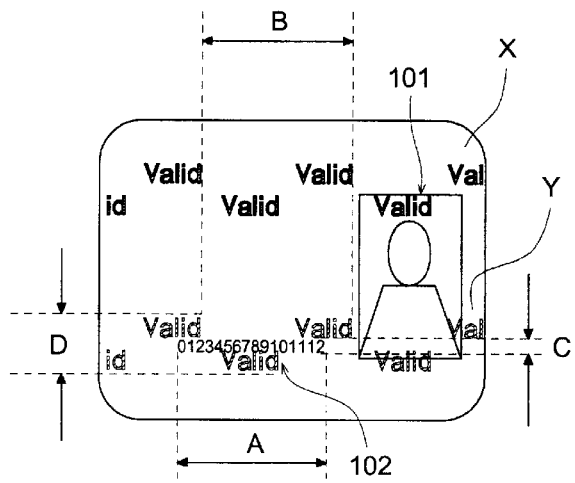
FIG. 10 shows a plan view of the image-recording medium shown in FIG. 9.

FIG. 9 shows an explanatory illustration of the layer structure of the image-recording medium, having the same layer structure as shown in FIG. 8, in which only the recording position of image information is different from that shown in FIG. 8, while FIG. 10 shows a plan view of the image-recording medium shown in FIG. 9.

As shown in FIG. 10, image 101 and characters 102 are formed in image-receiving layer 13 of image-recording medium 1, while hologram X and hologram Y are formed in hologram layer 12*b*.

Values A, B, C and D indicate the length of characters 102, the pitch of hologram Y in the longitudinal direction of characters 102, the width of characters 102 in the direction orthogonal to its longitudinal direction and the width of hologram Y in the direction orthogonal to the longitudinal direction of characters 102, respectively. Under a condition that value A is greater than value B, it is desirably possible to improve the preventive effect against forging or altering characters 102, since at least a part of characters 102 overlaps with hologram Y. In addition, to improve the preventive effect against forging or altering, it is also desirable that value D is greater than value C.

Figure 12:
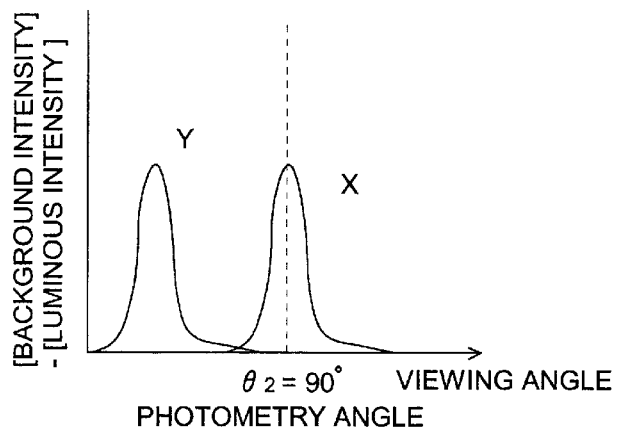
FIG. 12 shows viewing angles of two holograms with respect to the illuminating light.

Further, the viewing angle for hologram X is different from that for hologram Y. FIG. 12 shows viewing angles of hologram X and hologram Y with respect to the illuminating light entering at angle θ1. The viewing angle of hologram X exists in the vicinity of angle θ2, while the viewing angle of hologram Y is not duplicated with angle θ2. Incidentally, the term of the "viewing angle" is defined as an angle, at which the most clear optical variable image can be viewed.

In the following, there will be described a method for reading characters formed on image-recording medium 1, which comprises hologram X and hologram Y, by letting the illuminating light of optical reading apparatus 40, shown in FIG. 3, enter into the surface of image-recording medium 1 at angle θ1, and by receiving the reflected light coming from image-recording medium 1 in a direction (photometry direction) at angle θ2 to the surface of image-recording medium 1.

The region of existing characters 102 overlaps with hologram Y, as aforementioned. Therefore, the illuminating light of the optical reading apparatus 40 illuminates not only characters 102, but also hologram Y, when reading characters 102 by means of optical reading apparatus 40.

Reading section 41 receives the light entering in the direction at angle θ2 to the surface of image-recording medium 1. Then, a part of the illuminating light reflected from characters 102 can enter reading section 41, while another part of the illuminating light, reflected from hologram Y, cannot enter reading section 41. This is because the viewing angle of hologram Y is not duplicated with angle θ2, as shown in FIG. 12. Accordingly, it is possible to prevent reading section 41 from misreading characters 102 due to an interruption of hologram Y, as well as to prevent image-recording medium 1 from forging or altering, since hologram Y is designed in a manner such that the viewing angle of hologram Y, which is formed as overlapping with characters 102 to prevent it from forging or altering, is not duplicated with angle θ2 being in a photometry direction of optical reading apparatus 40.

Further, it is also possible to prevent image 101 from forging or altering, by arranging hologram X so as to overlap with image 101. In this case, it is desirable that the viewing angle of hologram X exists in the vicinity of angle θ2. Since optical reading apparatus 40 does not read image 101, hologram X does not impede the reading action of optical reading apparatus 40, even if the viewing angle of hologram X, overlapping with image 101, exists in the vicinity of angle θ2. In addition, it is also possible for an inspector to improve accuracy of the visual inspection for either presence or absence of forging, since the inspector can very easily observe hologram X, when an angle in the photometry direction of optical reading apparatus 40, namely, angle θ2 is 90° or around 90°, as shown in FIG. 3.

Further, since hologram X exhibits the same effect as the tally impression by overlapping hologram X with image 101, it is also possible to improve the preventive effect against forging or altering.

In the second embodiment of the present invention mentioned above, since image-recording medium 1, in which hologram images are arranged so as to overlap with at least a part of information 20, comprises hologram Y, viewing angle of which is not duplicated with the angle in the photometry direction of optical reading apparatus 40, and hologram X, viewing angle of which is duplicated with the angle in the photometry direction of optical reading apparatus 40, it is possible to obtain the high preventive effects against forging or altering. In addition, it is also possible to improve reading accuracy of the characters as well as to prevent the image-recording medium from forging or altering, since the viewing angle of the hologram overlapped with the characters is not duplicated with the angle in the photometry direction of the optical reading apparatus.

Incidentally, in the second embodiment of the present invention mentioned above, it is also possible to employ various kinds of optical variable devices other than a hologram, as described in the first embodiment of the present invention.

Figure 11:
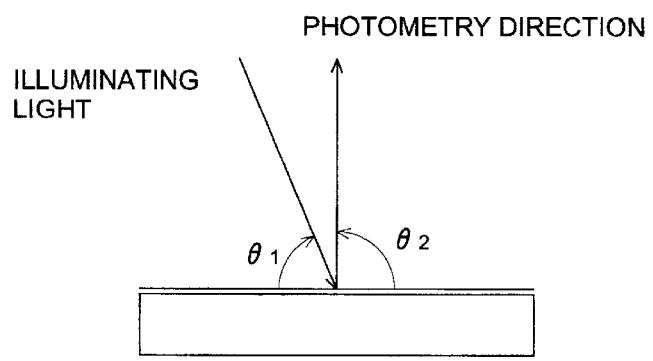
FIG. 11 shows an explanatory illustration of the illuminating light and photometry direction.

Further, as shown in FIG. 12, in the second embodiment of the present invention mentioned above, in case that an illuminating light is irradiated on image-recording medium 1 as shown in FIG. 11, although the difference of the luminous intensity between hologram Y and background at a photometry angle (which is 90° in the second embodiment) of the optical reading apparatus is set at a zero value, it is acceptable to set it at a higher real value but not to such an extent to impede the action of the optical reading apparatus for reading desired information. For instance, under a condition that the difference of the luminous intensity between hologram Y and background at a photometry angle in a range of 60°~120° is lower than 75% of the difference of the luminous intensity between characters and background, it is possible to prevent the optical reading apparatus from misreading the information, resulting in realization of the high accuracy reading action.

Next, the third embodiment of the present invention will be described in the following. The same descriptions as described in the second embodiment will be omitted in the following.

In image-recording medium 1 shown in FIG. 10, hologram Y is designed in a manner such that the wavelengths of the reflected light, generated by the illuminating light emitted from optical reading apparatus 40 onto characters 102 overlapping with hologram Y, do not include the photometry wavelength of optical reading apparatus 40. While, hologram X is designed in a manner such that the wavelengths of the reflected light, generated by the illuminating light emitted from optical reading apparatus 40 onto image 101 overlapping with hologram X, include the photometry wavelength of optical reading apparatus 40.

By designing hologram X and hologram Y in the manner mentioned above, it is possible to suppress the deterioration of reading accuracy due to interruption of the hologram, when reading the characters formed on image-recording medium 1. On the other hand, since image-recording medium 1 comprises the hologram, which can be detected by optical reading apparatus 40, it is possible to prevent it from forging. Further, in the third embodiment of the present invention, since the hologram, which generates the reflected light whose wavelength is included in the photometry wavelength of optical reading apparatus 40, is formed so as to overlap with the image, the preventive effect against forging of the image portion is highly improved.

Figure 13:
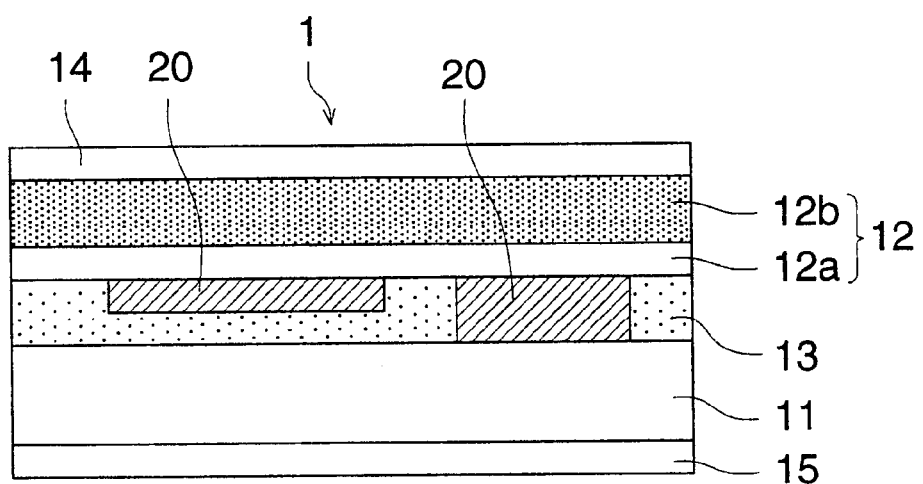
FIG. 13 shows an explanatory illustration of a layer structure of the image-recording medium.
Figure 14:
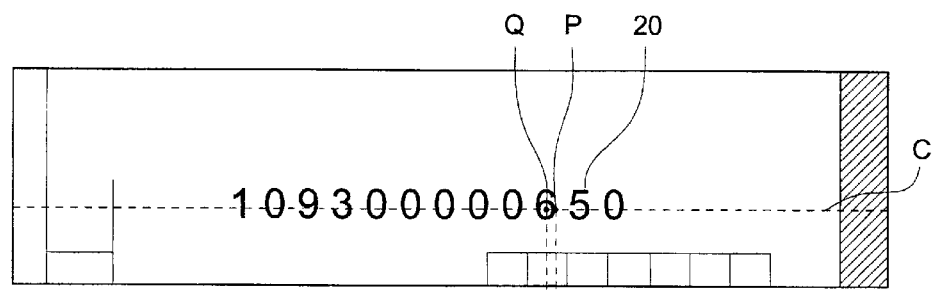
FIG. 14 shows a plan view of the image-recording medium.

Next, the fourth embodiment of the present invention will be described in the following. FIG. 13 shows an explanatory illustration of a layer structure of the image-recording medium, while FIG. 14 shows a plan view of the image-recording medium.

Since the hologram is formed in the hologram layer 12b of optical variable layer 12, so as to be overlaid on information 20, it is possible to prevent image-recording medium 1 from forging. In addition, the hologram is formed in the hologram layer 12b, so as to fulfill the following equation (1).

$$0.3 \leq (M_o - M_x)/M_x \tag{1}$$

where: $M_x$; the reflectance at point p, at which characters 101 is formed under the optical variable pattern, within a region where the optical variable pattern is formed in optical variable layer 12, $M_o$; the reflectance at point Q, at which characters 101 are not formed under the optical variable pattern.

Figure 15:
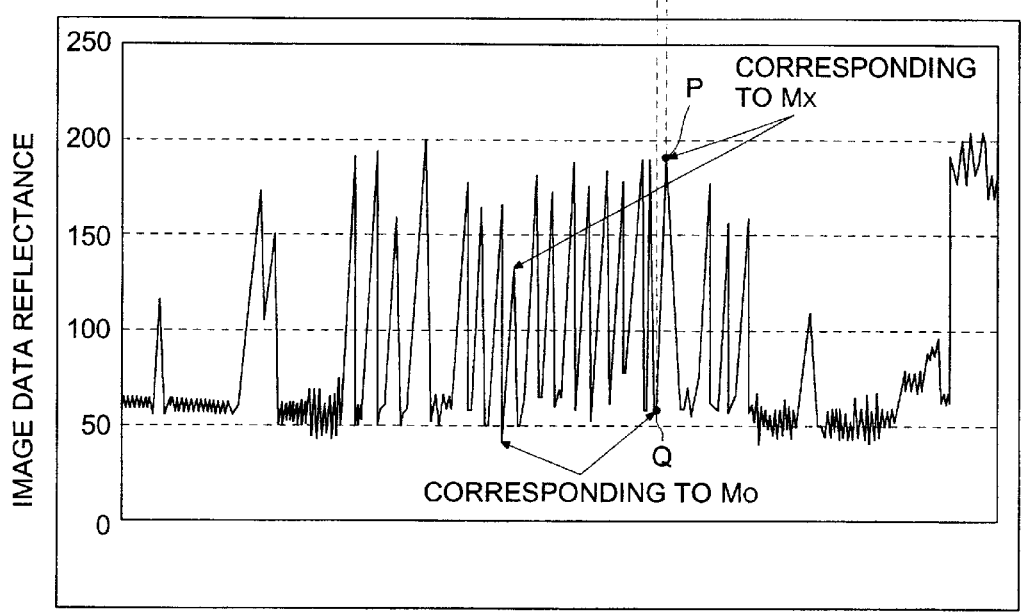
FIG. 15 shows a result of measuring the reflectance at each of points on the line shown in FIG. 14.

Further, FIG. 15 shows a result of measuring the reflectance at each of the points on line C shown in FIG. 14.

By forming the optical variable pattern so as to fulfill equation (1), it is possible to prevent the deterioration of the reading accuracy for characters 101 due to the interruption of the optical variable pattern overlapped with characters 101, even when optical reading apparatus 40 reads characters 101 recorded on image-recording medium 1. Further, it is more desirable that the hologram fulfills the following equation (2).

$$0.4 \leq (M_o - M_x)/M_x \tag{2}$$

where each of $M_o$ and $M_x$ is an average of the reflectance values measured at more than 20 points in the same image-recording medium.

Incidentally, the reflectance can be measured by employing a method in which the illumination light having a wavelength of 680 nm is irradiated onto the image-recording medium to capture the light reflected from it by means of a monochrome CCD which measures the amount of the reflected light, and then, the reflectance is derived from the following equation:

the reflectance=(the amount of the reflected light)/(the amount of the incident light).

As aforementioned, according to the present invention, it is possible for the optical reading apparatus to improve reading accuracy of the information, since no optical variable images, overlapped with information, emerge on the image-recording medium, when the optical reading apparatus reads the information from the predetermined direction by using the reflected light.

According to the invention, it is possible for the optical reading apparatus to improve reading accuracy of the information, since no optical variable images, overlapped with information, emerge on the image-recording medium, when the optical reading apparatus reads the information by relatively moving the image-recording medium and the reading section in the predetermined direction.

What is claimed is:

1. A card, bearing both an optical variable image and an informative image to be read by a reading apparatus, comprising:

an optical variable layer adapted to include said optical variable image;

an image-receiving layer adapted to receive and include said informative image, said image-receiving layer being overlaid on said optical variable layer so that said informative image overlaps with at least a portion of said optical variable image; and a substrate, on which said optical variable layer and said image-receiving layer are provided;

wherein said optical variable image is formed such that said optical variable image is visible when said informative image overlaps therewith when viewed from a first direction, and said optical variable image is substantially non-visible when viewed from a second direction, such that said reading apparatus can optically read said informative image from said second direction without disturbance of said optical variable image.

2. The card as defined by claim 1, wherein the following equation is fulfilled, $$0.3 \leq (M_o - M_x)/M_x,$$

where $M_x$ is the reflectance at a first point, at which said informative image is formed under said optical variable image, and $M_o$ is the reflectance at a second point, at which said informative image is not formed under said optical variable image.

3. The card as defined by claim 2, wherein said informative image includes character information.

4. The card as defined by claim 2, wherein both a first optical variable image and a second optical variable image are formed in said optical variable layer, and wherein a viewing angle of said first optical variable image is different from a viewing angle of said second optical variable image.

5. A method of reading an informative image from an image recording medium which includes said informative image and an optical variable image, said informative image overlapping with at least a part of said optical variable image, said optical variable image being visible when said informative image overlaps therewith when viewed from a first direction, and said optical variable image being substantially non-visible when viewed from a second direction, the method comprising the steps of:

irradiating a light onto said image-recording medium; and receiving at least a part of said light, reflected from said second direction, with a photo-sensor so as to read said informative image without disturbance of said optical variable image.

6. The method as defined by claim 5, wherein said image recording medium comprises an optical variable layer which includes said optical variable image, an image-receiving layer adapted to receive and include said informative image, and a substrate on which said optical variable layer and said image-receiving layer are provided, and wherein said image-recording layer is interposed between said optical variable layer and said substrate.

7. The method as defined by claim 5, wherein said informative image includes character information.

8. A method for reading an informative image from an image recording medium, bearing said informative image and an optical variable image, said informative image overlapping with at least a part of said optical variable image, the method comprising steps of:

irradiating a light onto said image-recording medium; and receiving at least a part of said light, reflected at an angle other than a viewing angle for viewing said optical variable image, with a photo-sensor so as to read said informative image without disturbance of said optical variable image.

9. The method as defined by claim 8, wherein said image recording medium comprises an optical variable layer adapted to include said optical variable image, an image-receiving layer adapted to receive and include said informative image, and a substrate on which said optical variable layer and said image-receiving layer are provided, and wherein said image-recording layer is interposed between said optical variable layer and said substrate.

10. The method as defined by claim 8, wherein said informative image includes character information.

11. A reading apparatus for reading an informative image from an image recording medium which includes said informative image and an optical variable image, said informative image overlapping with at least a part of said optical variable image, said optical variable image being visible when said informative image overlaps therewith when viewed from a first direction, and said optical variable image being substantially non-visible when viewed from a second direction, the reading apparatus comprising:

a light-irradiating device to irradiate light onto said image-recording medium; and a photo-sensor to receive at least a part of said light reflected from said second direction so as to read said informative image without disturbance of said optical variable image.

12. The reading apparatus as defined by claim 11, wherein said image recording medium comprises an optical variable layer adapted to include said optical variable image, an image-receiving layer adapted to receive and include said informative image, and a substrate on which said optical variable layer and said image-receiving layer are provided, and wherein said image-recording layer is interposed between said optical variable layer and said substrate.

13. The reading apparatus as defined by claim 11, wherein said informative image includes character information.

14. A card, bearing both an optical variable image and an informative image comprising:

an optical variable layer adapted to include said optical variable image;

an image-receiving layer adapted to receive and include said informative image, said image-receiving layer being overlaid on said optical variable layer so that said informative image overlaps with at least a portion of said optical variable image; and a substrate, on which said optical variable layer and said image-receiving layer are provided;

wherein said optical variable image is formed such that said optical variable image is visible when said informative image overlaps therewith when viewed from a first direction, and said optical variable image is substantially non-visible when viewed from a second direction but said informative image is visible from said second direction.

* * * * *